March 2, 1971  C. E. VAN HALL  3,567,385
METHOD AND APPARATUS FOR DETERMINING THE OXYGEN DEMAND
OF OXIDIZABLE MATERIALS
Filed Feb. 3, 1969  2 Sheets-Sheet 1

INVENTOR.
Clayton E. Van Hall
BY
Earl D. Ayers
AGENT

March 2, 1971 C. E. VAN HALL 3,567,385
METHOD AND APPARATUS FOR DETERMINING THE OXYGEN DEMAND
OF OXIDIZABLE MATERIALS
Filed Feb. 3, 1969 2 Sheets-Sheet 2

INVENTOR.
Clayton E. Van Hall
BY Earl D. Ayers
AGENT

:::::::::::::::::::::::::::::::::::::::::::::::::::::::::::::::::::::::::::::::::::::::::::::

United States Patent Office 3,567,385
Patented Mar. 2, 1971

3,567,385
METHOD AND APPARATUS FOR DETERMINING THE OXYGEN DEMAND OF OXIDIZABLE MATERIALS
Clayton E. Van Hall, Midland, Mich., assignor to The Dow Chemical Company, Midland, Mich.
Continuation-in-part of application Ser. No. 710,249, Mar. 4, 1968. This application Feb. 3, 1969, Ser. No. 801,230
Int. Cl. G01n 31/10, 31/12, 33/16
U.S. Cl. 23—230
13 Claims

ABSTRACT OF THE DISCLOSURE

Method and apparatus for determining the oxygen demand of a material containing oxidizable components, which method involves the combustion of a small sample of the material to be analyzed in a heated, continuous stream of carbon dioxide. Carbon monoxide produced as the result of combustion with carbon dioxide relates directly to the total oxygen demand (TOD) of the sample. Hence, quantitative analysis of the combustion gases for carbon monoxide yields a measure of the oxygen demand of the sample. By TOD is meant the net oxygen demand of the sample. Thus, oxygen dissolved in the sample and other oxidant source materials contained in the sample lower the oxygen demand of the sample as it is measured in accordance with the invention.

The carbon dioxide feed gas plus the sample are introduced into a combustion tube, moisture is then removed from the effluent, and the moisture-reduced effluent then is passed through a suitable carbon monoxide detector. The effluent then is processed to convert carbon monoxide therein to carbon dioxide and the thus processed effluent is then pumped at a controlled flow rate and is re-introduced to the combustion chamber.

BACKGROUND OF THE INVENTION

This application is a continuation-in-part of Clayton E. Van Hall's co-pending application Ser. No. 710,249, filed Mar. 4, 1968, now abandoned, for "Method and Apparatus for Determining the Oxygen Demand of Oxidizable Materials."

The present invention relates to the problem of analyzing combustible or oxidizable materials for their oxygen demand. A special and most useful embodiment of the invention involves determining the total oxygen demand (TOD) of aqueous systems, e.g., waste streams. The invention is particularly concerned with a method and apparatus for measuring the TOD of oxidizable materials.

In the field of sewage treatment, chemical oxygen demand (COD) has long been used as a measure of pollution. A common method for determining COD is described in a publication of the American Public Health Association, "Standard Methods for the Examination of Water and Waste Water," 11th edition, New York, 1960, page 399. Basically, the technique described therein involves oxidation of the sewage sample with potassium dichromate in 50 percent sulfuric acid. The amount of dichromate reacted reflects the extent of oxidation, thus titration of residual dichromate yields a measure of the oxygen demand of the system. Although this method yields useful results, the length of time to achieve an analysis is excessive.

It would be desirable, and it is a principal object of the present invention to provide a rapid method for measuring the oxygen demand of an aqueous system. A further and more comprehensive purpose of the invention is to provide a convenient method for measuring the oxygen demand of any oxidizable material. An additional object is to provide apparatus for carrying out the foregoing determinations. Still further objects are to provide methods and apparatus which increase the sensitivity of the measurement. These objects, and other benefits, as will become apparent hereinafter, are accomplished in accordance with the present invention.

Accordingly, the invention involves a method for determining the oxygen demand of a material containing oxidizable components, which method involves the combustion of a small sample of the material to be analyzed in a heated, continuous stream of carbon dioxide. As will be shown in the following examples, the carbon monoxide produced as the result of combustion with carbon dioxide relates directly to the total oxygen demand (TOD) of the sample. Hence, quantitative analysis of the combustion gases for carbon monoxide yields a measure of the oxygen demand of the sample. As used herein, "combustion" refers to the reaction or equilibration of carbon dioxide with an oxidizable material in the sense that the oxidant (carbon dioxide) is reduced and the oxidizable material is oxidized. By TOD is meant the net oxygen demand of the sample. Thus oxygen dissolved in the sample and other oxidant source materials contained in the sample lower the oxygen demand of the sample as it is measured in accordance with the invention.

In process terms, the invention involves establishing a flowing feed gas stream containing carbon dioxide as essentially the sole oxidant. This gas stream is passed, on a continuous recirculating basis, through a combustion conduit having a heating zone at a temperature high enough to cause some combustion, or equilibration, of the oxidizable components of the material to be analyzed with carbon dioxide. Often two combustion conduits, series connected and separated by a moisture reducing device, are used. Such equilibration occurs to a degree at temperatures as low as about 500° C., but preferred and more uniform combustion is achieved at temperatures above about 650° C. The upper end of the temperature range is limited by the fusion temperature of materials used in the heated zone of the combustion conduit, but it is preferred that the temperature should not exceed 1000° C.

Contained within the heating zone of the combustion conduit (or each combustion conduit if two are used), is a gas-permeable catalyst bed through which the carbon dioxide-containing gas stream flows. The bed is preferably at least about 2 cm. in length. It is the function of the catalyst bed to promote the equilibration of carbon dioxide with oxidizable components of the material analyzed to produce carbon monoxide.

Suitable catalyst materials include for example, high melting noble metals such as platinum, palladium, iridium, rhodium, ruthenium and gold. Siliceous materials such as quartz are effective to a degree. A preferred catalyst is platinum. For purposes of economy, the noble metals are used in a form which present a large surface area per unit weight of the metal. Often such catalysts are coated on an inert support. To be suitable in general, a catalyst should be effectively free from substances that reduce carbon dioxide to carbon monoxide, or supply oxygen to organic matter in the sample. Thus, iron, nickel, copper and similar metals, which are reactive either with carbon dioxide, carbon monoxide, oxygen, or components of the samples should be excluded from the high temperature zone. Similarly the higher oxides of most elements should be excluded.

From the heating zone and catalyst bed the gas stream is passed into an analyzer for quantitatively determining the amount of carbon monoxide in the presence of carbon dioxide. Analytical devices for this purpose are known. One particularly suitable for use in the present invention is a non-dispersive infrared analyzer which produces an electrical signal in proportion to carbon monoxide content of the gas stream. The signal may be read out by any convenient means such as a graphic recorder. The gas stream is then pumped through a Hopcalite tube or similar device to convert the carbon monoxide to carbon dioxide before the gas stream is again recirculated into the entry part of the combustion conduit.

Having established a carbon-dioxide feed gas stream flowing through the combustion conduit and thence into the carbon-monoxide analyzer, a quantity of the combustible material to be analyzed is inserted into the heated zone of the combustion conduit on the upstream side of the catalyst bed. The continued flow of the gas stream sweeps gaseous product formed through the catalyst bed. Effluent gas from the heated zone containing the equilibrated gaseous reaction product of carbon dioxide and oxidizable components of the material to be analyzed flows into the carbon-monoxide analyzer whereby the incremental increase in carbon monoxide of the gas stream is measured.

In the preferred practice of the invention this measurement is obtained in the form of an electrical signal which is a function of the carbon-monoxide content of the effluent gas. Such a signal is readily calibrated to provide a direct reading of carbon monoxide produced and, as will be demonstrated hereinafter, the total oxygen demand (TOD) of the sample analyzed.

It will be seen that the feed or carrier gas serves simultaneously as the reagent which oxidizes reducing material in the sample, and as a carrier gas which sweeps the reaction products from the combustion zone and through the detector.

The feed gas containing carbon dioxide as essentially the sole oxidant may also contain any one or more of the inert gases such as nitrogen, helium, argon, krypton and the like and ordinarily will contain some small amount of oxygen as an impurity.

Although a gas containing small amounts of oxidizing components can be used in the practice of the invention to provide useful results, greater accuracy and sensitivity is obtained by assuring effective elimination of oxygen and other gases of greater oxidation potential than carbon dioxide by incorporating a volatile reducing component into the gas in an amount more than sufficient to react with oxidizing impurities in the feed gas. Any one of a number of reducing reagents such as hydrogen, carbon monoxide, methanol, acetone, or ammonia may be incorporated in controlled amounts into the feed gas stream for this purpose. When the gas mixture is heated, the reducing component reacts with the oxidizing impurity.

Although it is not necessary, it is usually preferred to pass the gaseous effluent from the heating zone through a cooling zone wherein the temperature of the gas stream is lowered to a temperature below that of the apparatus used for detecting the carbon monoxide. Thus, moisture, if any is present, is largely separated from the gas stream prior to its entry into the detector. Such condensate is accumulated in the cooling zone and means are provided for its collection and removal as needed.

In practice, with many materials to be analyzed, more accurate results are achieved if, after the moisture is largely separated, the feed gas and sample to be analyzed are run through a second combustion tube (the same type as the first tube) before being fed to the detector.

As previously stated, the invention is applicable to the analysis of all materials containing oxidizable components. Thus, gases and solids as well as liquids can be analyzed for their TOD in accordance with the invention. Sample size is not critical, but small samples on the order of 0.001 to 0.1 cubic centimeter for liquid and solid samples and 0.001 to 5 cubic centimeters for gas samples permit the use of equipment of convenient design.

A major and most useful application of the invention is to the analysis of aqueous systems containing oxidizable components. A special design consideration important to the success of such analysis is the positioning of the catalyst bed within the combustion conduit. For such operation, the catalyst bed is preferably positioned within the heated zone of each combustion conduit at some distance from the gas inlet. This distance is sufficient to define, in conjunction with the confines of the conduit itself, a sample expansion zone within the heated zone. Upon injection of the liquid sample to be analyzed, sample vapors generate for an instant some back pressure. The feed gas within the sample expansion zone at the instant of injection forms a gas blanket which prevents significant diffusion or back flow of sample vapors out of the heated zone. Sufficient volume of the sample expansion zone is indicated by the absence of condensate formation in the inlet of the feed gas stream.

For best operation in analyzing liquid materials, the line of sample injection should deposit a sample at about, or on, the upstream face of the catalyst bed. A line of injection which is essentially parallel to the longitudinal axis of the combustion conduit and the application of sufficient injection force assures such a result.

Various carbon monoxide detection techniques enable determination of the total amount of carbon monoxide formed according to the integral.

$$Qco = \int_{t_1}^{t_2} f(dq/dt)$$

wherein $Qco$ is the amount of carbon monoxide generated upon injection of the test sample and $dq/dt$ is the differential of carbon monoxide in the effluent gas at any one instant. The time period of carbon monoxide variation from the feed gas stream is defined by $t_2-t_1$.

The preferred mode of operation involves correlating cabon monoxide content with some characteristic of an electrical signal generated by the carbon monoxide detector. For example, an amperometric or potentiometric signal will exhibit displacement from a normal base line. The height or amplitude of the displacement can be correlated with the change in carbon monoxide content of the effluent gas. To achieve such operation, however, certain parameters of the process should be controlled to provide reproducible results. For instance, it is necessary that the feed gas stream be controlled to a predetermined and constant rate of flow (predetermined means preset level; knowledge of absolute flow rates is not necessary). It will be determined for any particular equipment design chosen, i.e. volume of combustion conduit, flow rate capacity of carbon monoxide detector and temperature of the combustion conduit, that there will be a range of flow rates over which optimum signals will be generated. Thus for equipment of a given design, an optimum flow rate is readily determined by measuring a sample with a known TOD over a series of incrementally increasing flow rates. In this manner, an optimum flow rate will be defined which produces a sharp and discriminating signal and is preferably relatively insensitive to minor variations in flow rate. This technique will be illustrated with reference to a particular apparatus in the examples.

Normally with equipment of convenient design the combustion conduit will have a bed volume within the range from about 10 to 200 cubic centimeters, preferably from about 25 to about 75 cubic centimeters. By "bed volume" is meant the total volume of the heated zone within the combustion conduit. For liquid samples, the sample size will usually range from about 0.005 to about 0.5 percent, preferably 0.01 to 0.1 percent, of the bed volume. Combustion temperatures are usually within the range of about 800 to about 90° C. Such temperatures promote efficient equilibration of carbon dioxide with oxidizable components of the test sample and signal characteristics subsequently generated by electrical detectors of carbon monoxide are relatively independent of small variations in the combustion temperature.

Detectors which may be used to measure the carbon monoxide in the effluent gases from the combustion conduit include any of the known means for quantitatively analyzing a gas stream for its carbon monoxide content. As previously mentioned, the preferred detector produces an electrical signal, the strength of which can be correlated with the concentration of the measured quantity. A preferred detector is a non-dispersive, infrared analyzer sensitized for carbon monoxide. A signal output from such an analyzer is adapted by a suitable amplifier and graphic read-out means, such as a strip chart recorder, to provide readings which can be converted to, or read directly as, carbon monoxide concentration in the effluent gas and hence the TOD of the test sample. To provide comparable analytical readings for calibration of the generated signal, care must be exercised to insure that test sample volumes, amplifier gain, recorder voltage, and process operating parameters involving temperature and gas flow rates are identical or within operational levels at which the analytical results are independent of these variables.

Apparatus for carrying out the described analytical process, and certain preferred embodiments thereof are illustrated in the accompanying drawings.

Figure 1:
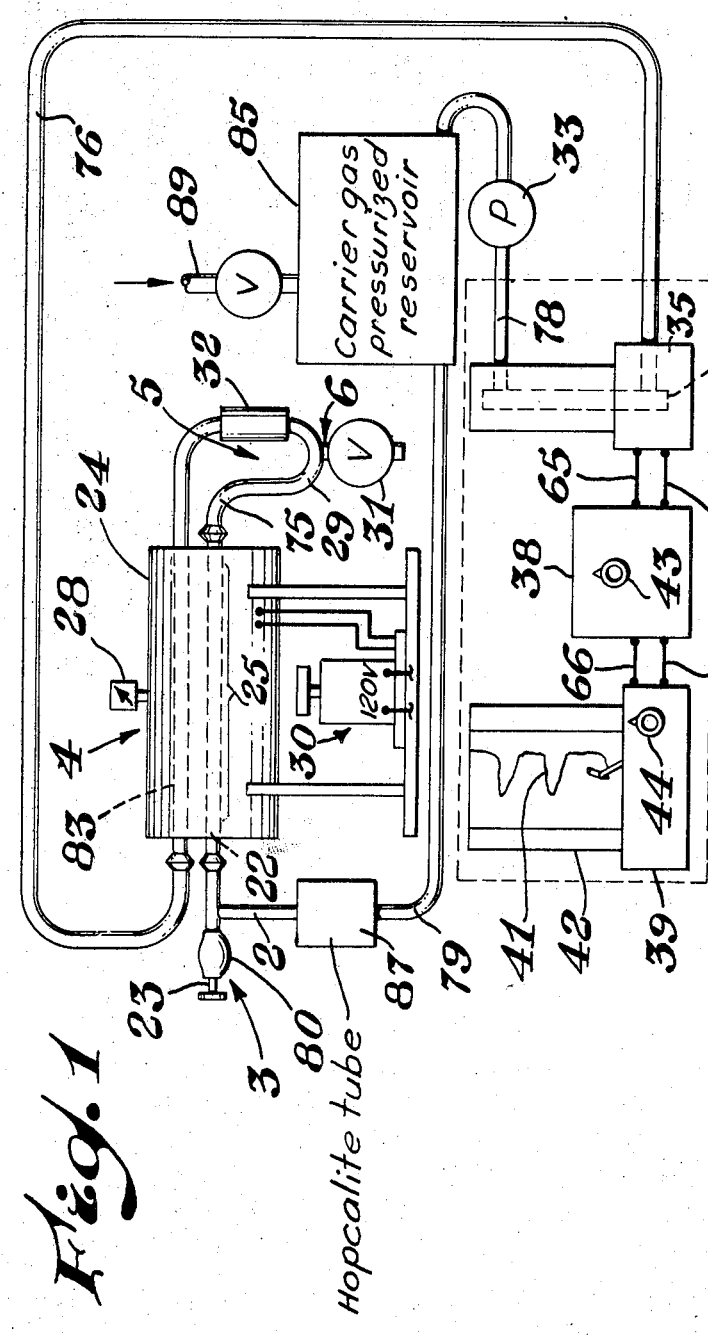
FIG. 1 is a schematic drawing of a complete apparatus suitable for accomplishing the analysis of liquid or gaseous materials containing oxidizable components.

The apparatus of FIG. 1 comprises carbon dioxide feed gas supply means 2, sample injection means 3, heating means 4, combustion conduits 22 and 83 within the heating means 4, cooling means 5, condensate removal means 6 integral with the cooling means 5, drying means 32 also incorporated in the cooling means 5 between the condensate removal means 6 and the combustion conduit 83, and carbon monoxide detection means 7. In the illustrated preferred embodiment, the feed gas supply means comprises a reservoir of pressurized carrier gas including carbon dioxide 85, a pump 33, a carbon monoxide to carbon dioxide conversion device 87, such as a Hopcalite tube, for example, connected in series between the output of the detector 35 and the inlet 58 of the sample and gas inlet 54 by means of tubes 78, 79, for example.

Sample to be analyzed is introduced at the gas inlet end of the combustion tube 22 by an injection means 3, such as the illustrated syringe 23.

Gaseous effluent from the combustion conduit 22 passes into cooling means 5, which in the illustration is an air-cooled condenser 29 equipped with condensate removal means 6 in the form of a stopcock 31 for discharge of accumulated condensate. The cooled effluent gases, with the moisture sharply reduced, then pass through the drier means 32 and back through a second combustion conduit 83, similar to or like the combustion conduit 22 and tube 76 into carbon monoxide-detection means 7.

The illustrated carbon monoxide detection means 7 consists of an electrically connected combination of a non-dispersive, carbon monoxide-sensitized, infrared analyzer 35. This analyzer produces a variable voltage signal to be amplified by means of a low-voltage amplifier 38. The enhanced electrical signal is fed into a continuous graphic recorder 39 which produces a curve on a paper strip 42. Either the amplitude of or the area under the curve 41 is a function of the carbon monoxide in the effluent gases measured in the detection cell 36 of the infrared analyzer 35. Useful controls in the detection means are the amplifier gain control 43 and the recording voltage range control 44.

After passing through the detection cell 36 the feed and carrier gas is pumped, by means of pump 33, through the carrier gas pressurized reservoir 85 and a Hopcalite tube 87, for example, to convert the carbon monoxide in the feed or carrier gas to carbon dioxide before the feed or carrier gas is recirculated through the apparatus via inlet 58.

The various components of the foregoing apparatus are interconnected to provide a continuous gas stream with suitable gas conveying conduits 75, 76, 78, and 79. Carrier gas may be introduced or withdrawn through the valved tube 89 which is coupled to the carrier gas reservoir.

Figure 2:
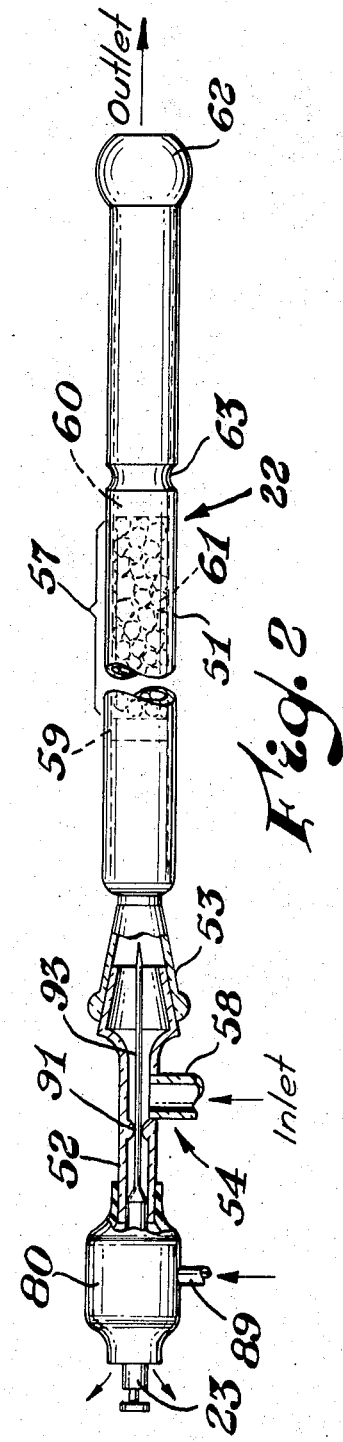
FIG. 2 is a detailed illustration of a combustion conduit containing a catalyst bed.

In FIG. 2 the combustion conduit 22 is shown in more detail. It consists of two separable parts which are a feed gas inlet 54 and a cylindrical combustion tube 51. Seated within the feed gas inlet 54 is an injection tube 52 adapted to receive the syringe 23. The injection tube 52 is aligned in a direction essentially parallel to the longitudinal axis of the combustion tube 51. The syringe 23 is surrounded by a protective gas jacket 80, into which suitable gases including carbon dioxide or inert or non-reactive gases may be introduced, as through the tube 89. The injection tube 52 has a section of reduced diameter 91 through which the needle of the syringe 23 extends. The section of reduced diameter 91 is adjacent to the inlet 58 between the inlet 58 and the jacket 80. The feed gas inlet 54 is coupled with the cylindrical combustion tube 51 through a ground glass joint 53. Within the cylindrical combustion tube 51 is a catalyst bed 57 of platinum gauze balls 61 maintained in place by means of catalyst-positioning elements 59 and 60, the latter of which is seated against an indentation 63 in the tube 51. Each end of the assembled combustion conduit 22 is adapted for coupling with preceding and succeeding apparatus elements. The upstream feed gas inlet is a small tubular nipple 58 and the downstream outlet, coupling means is a ball portion 62 of a ball joint. The combustion tube 83 may be identical to the combustion tube 22 except it has no feed gas inlet 54, the output of the drying means 32 being coupled to its inlet end.

Certain preferred embodiments of the above-described fundamental apparatus components have been set forth. Numerous alternatives will occur to those skilled in the art. Modifications necessary to adapt the apparatus for the analysis of solid and gaseous samples, as well as liquid samples, will readily occur to those skilled in the art.

For instance, with regard to the feed gas supply means 2, it is only necessary that there be provided a confined stream of carbon dioxide preferably subject to precise flow rate control. With respect to preferred operation, knowledge of the actual flow rate is not necessary so long as the gas flow rate can be controlled to a predetermined and constant rate. To this end any combination of mechanical means for supplying and regulating a recirculating gas stream can be used in place of that illustrated. Insofar as heating means 4 is concerned, apparatus capable of providing controlled heating over a temperature range of 500 to 1000° C. can be used. Although an electric resistance furnace is efficient for this purpose, induction heating means, or any other convenient heating means, can be used.

Similarly, sample injection means 3 can be provided by any mechanical apparatus capable of supplying measured aliquots of materials and inserting them into the heating zone 25 of the combustion conduit 22. For example, direct insertion of a liquid sample to be analyzed into the heating zone 25 can be accomplished by sprayers adapted to provide controlled amounts of sample spray. Injection of solid samples is readily achieved by known means. For instance, if the combustion tube 22 is aligned vertically, the sample is simply dropped into the heated zone.

Cooling of gaseous effluent of the tube 22 to remove moisture is desired to protect or optimize the detection operation, and may be accomplished in a conventional manner, such as by passing the gaseous effluent through the illustrated air-cooled condenser 29. Alternately, water-cooled condensers are effective for this purpose. It is possible, however, to obtain useful results without cooling the gaseous effluent.

Although it is not necessary to operability, it is preferred to employ a drying means 32 which will retain any moisture entrained in the gaseous product prior to its introduction into the second combustion tube 83.

The particular carbon monoxide detection means 7 described above is preferred but any analytical apparatus capable of indicating the quantity of carbon monoxide in the gaseous product with desired sensitivity and specificity can be used. Illustratively, fuel cells and galvanic sensing devices may be adapted for the analysis of carbon monoxide.

Materials of construction employed in the above combustion gas train must generally meet the criteria of having resistance to carbon dioxide and moisture. Moreover, it is desirable, at least in the gaseous product train, that materials of construction be essentially non-reactive to carbon monoxide. Within the combustion zone itself, it is necessary that the materials of construction be inert to the combustion products of samples analyzed at the elevated temperatures used for combustion. Such materials include, for example, fused silica, Vycor glass, glazed ceramics and the like siliceous materials.

In a specific embodiment of the above-described apparatus shown in FIG. 1, a 3/16 inch butyl rubber tubing was utilized to provide the connecting conduits 75, 76, 78 and 79.

Combustion-supporting temperatures within the combustion conduits 22 and 83 were generated with an electric muffle furnace 24 operating on a voltage of 120 volts and a maximum power consumption of 900 watts. The power control 30 was a Powerstat variable voltage transformer.

The combustion tube 51 was a fused silica cylinder having an inside diameter of 1.27 centimeters and a length of about 40 centimeters. The heated zone 25 of the combustion conduit 22 was about 30 centimeters long. A gas inlet 54 was provided in the form of a tubular glass T, with the cross bar of the T having a Vycor ground glass joint 53 at one end for coupling with the fused silica combustion tube 51 and a No. 18 stainless steel syringe needle 98 about 4.8 centimeters long seated in the opposite end of the cross bar as receiving means for sample injection means in the form of a syringe. When the components of the combustion conduit 22 were assembled, the needle 98 was directed in a line essentially parallel with the longitudinal axis of the combustion tube 51. The stem of the tubular glass T provided a nipple 58 for connection with the 3/16 inch gum rubber interconnecting conduit 74. A Hamilton No. 705N syringe 23 was employed as the injection means 3.

Within the combustion tube 51 at about 24 centimeters from the inlet end thereof was placed a catalyst bed 57 about 13 centimeters long constructed of platinum gauze balls 61. The catalyst bed was held in place by catalyst positioning elements 59 and 60 in the form of quartz wool plugs one centimeter long on both ends of the platinum gauze balls. The catalyst bed was formed by gently tamping one quartz wool plug into place against a retaining indentation 63 within the combustion tube 51 with a glass rod, adding the platinum gauze balls and then the second quartz wool plug. After its component parts had been assembled, the combustion conduit 22 was placed within the electric muffle furnace 24 so that the tip of the syringe needle 93 was just outside the heating zone of the furnace 24 but yet in position such that, upon injection of the aqueous sample, the full amount thereof was deposited within the heating zone 25 of the combustion conduit 22. The combustion tube 83 lies parallel to the tube 22 in the furnace 24.

The gaseous products produced upon injection of a test sample were conducted through a gas train consisting of a series arrangement of an air-cooled condenser 5, a U-shaped water trap 29, drying means 32, then back through the combustion tube 83. The water trap 29 was adapted for intermittent drainage of accumulated water by means of a stopcock 31. The interconnecting conduit 76 consists of 3/16 inch butyl rubber tubing.

Carbon monoxide detection means 7 employed with the foregoing apparatus consisted of an infrared analyzer 35 (Beckman Model 21) equipped with a 13.3 centimeter detection cell 36 sensitized for determination of carbon monoxide. The detection cell 36 was maintained at a temperature of 45° C. to prevent the formation of condensate which would interfere with the accuracy of the analytical result. Output from the analyzer 35 was fed by electrical leads 64 and 65 to a low voltage amplifier 38. Subsequently, the amplified output of the analyzer was fed into a graphic recorder 39 (Sargent Model MR) through electrical leads 66 and 67. The recorder 39 was set by the voltage recording range control 44 to operate in the 0–2.5 millivolt range. The gain control 43 of the amplifier 38 was set at a predetermined level to provide a desired response in the recorder 39.

EXAMPLE 1

Using an apparatus such as that described above, a series of operations was carried out to demonstrate the utility of the described method for determining the total oxygen demand of various materials. Most of these operations were carried out on aqueous dispersions of oxidizable materials, but the process with certain modifications to accommodate the materials handled, can be adapted to the analysis of any oxidizable material whether it be gas, liquid or a solid.

To carry out these analytical operations, a flow of carbon dioxide was established through the apparatus at a rate of about 130 cubic centimeters (STP) per minute. The heated zone of the combustion conduit was brought up and maintained at a temperature of about 875° C.

Initially a calibrating curve was prepared for converting signal amplitude, i.e. recorded curve peak height, into the total oxygen demand (TOD) of analyzed samples. To this end, solutions were made up containing varying amounts of sodium acetate to provide a series of aqueous solutions with incrementally increasing known oxygen demands.

Subsequently, using the data obtained on sodium acetate solutions as a reference standard, a series of oxidizable materials representing both organic and inorganic species were analyzed in accordance with the invention. The results of these experiments are set forth in the following Table I.

TABLE I

| Compound [1]: | Total oxygen demand, mg./l. | | Measurement efficiency, o./o. |
|---|---|---|---|
| | Calculated [2] | Found [3] | |
| Acetic acid | 246 | 239 | 97.2 |
| Benzoic acid | 250 | 248 | 99.2 |
| Oxalic acid | 250 | 244 | 97.6 |
| Glycine | 250 | 248 | 99.2 |
| Urea | 250 | 250 | 100.0 |
| Ammonium chloride | 250 | 274 | 109.6 |
| p-Nitroaniline | 250 | 244 | 97.6 |
| Phenol | 245 | 216 | 88.2 |
| Sucrose | 248 | 215 | 86.7 |
| Acetone | 173 | 145 | 83.8 |
| Ethanol | 235 | 200 | 85.1 |
| Methanol | 238 | 205 | 86.1 |

[1] In an aqueous solution.
[2] Calculated oxygen demand equals milligrams of oxygen required per liter of solution to give complete oxidation of the sample to water, carbon dioxide and nitrogen.
[3] Calibrated with data obtained on solutions of sodium acetate with nown TOD values.

Ammonium chloride was the only material of those tested that yielded results higher than calculated. This is probably due to a secondary reaction of hydrogen chloride with carbon dioxide in the presence of platinum. Samples of hydrochloric acid or sodium chloride containing the same chloride concentration as the ammonium chloride standard gave oxygen demand results that corresponded to the amount that the ammonium chloride standard was high, thus substantiating the proposed cause of this interference. However, it has been found that chloride in the presence of an oxidizable material such as sodium acetate exhibits lower interference.

EXAMPLE 2

The method of the invention has been applied to the analysis of waste waters. Two waste streams were tested. One stream was a raw sewage which had been clarified by settling for two hours. The other stream was from the same raw sewage but had been treated with a high molecular weight, anionic polymer flocculant and the resulting suspension also settled for two hours. Twelve daily composite samples were taken from each stream.

Each of the composite samples was divided into two portions, one of which was subjected to a conventional COD analysis by chemical oxidation. The other was blended for 5 minutes to produce a uniform dispersion, which was then subjected to analysis in accordance with the invention.

Figure 3:
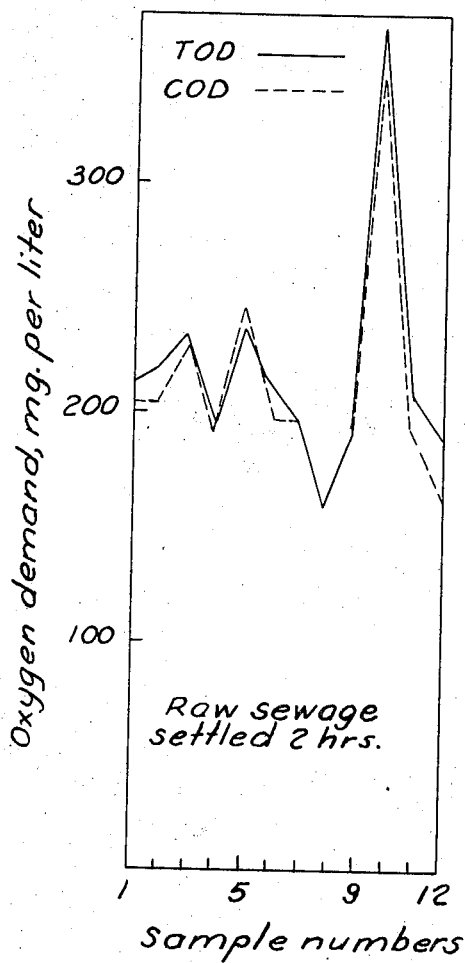
FIGS. 3 and 4 show comparative results of COD measurements made by the prior art technique and the TOD measurements of the present invention on two series of sewage samples.
Figure 4:
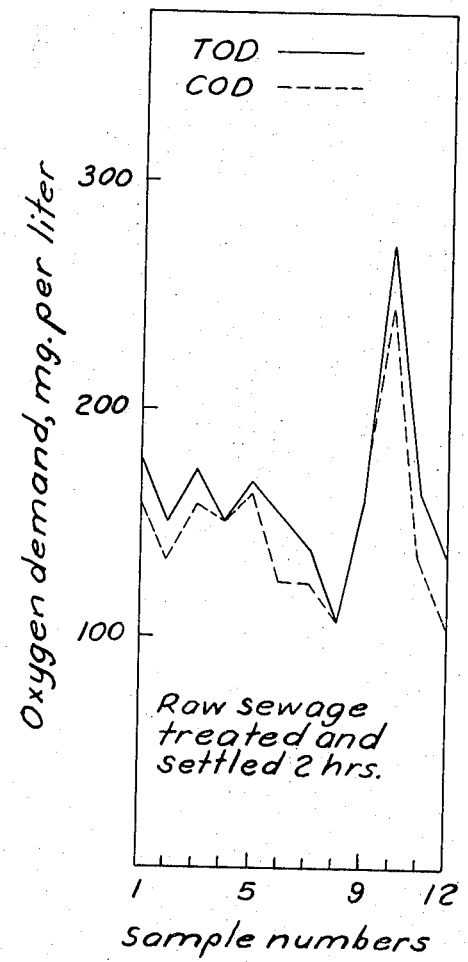

The results of these experiments are plotted in FIGS. 3 and 4. A close correlation in the results of the two methods is evident.

EXAMPLE 3

The general applicability of the analytical process set forth herein is illustrated according to the following mathematical treatment. Assuming an oxidation reaction for the types of compounds most likely to occur in domestic waste streams, one obtains a generalized equation as follows:

(1) $$\frac{n}{2} O_2 + C_a H_b N_c O_d \rightarrow aCO_2 + \frac{b}{2} H_2O + \frac{c}{2} N_2$$

Manifestly, to balance the above equation the value of $n$ (the number of oxygen atoms required) is:

(2) $$n = 2a + \frac{b}{2} - d$$

Solving the equation for $n$ requires the determination of three variables. The value of $a$ can be determined as the total carbon according to the method of patent application Ser. No. 380,597 now U.S. Pat. No. 3,296,435. However, the values of $b$ and $d$ are independent variables not readily measured, particularly with a dilute aqueous sample. Thus, there exists neither a true correlation with total carbon nor a technique for the direct measurement of $b$ and $d$ in the above equation to provide a useful method of determining $n$ the oxygen demand.

In accordance with the invention, however, carbon dioxide gives up a part of its oxygen to produce an oxidation product and carbon monoxide as the reduction product of the carbon dioxide. Since carbon dioxide can only oxidize carbon to carbon monoxide, the equation illustrating such a combustion or oxidation reaction is as follows:

(3) $$mCO_2 + C_a H_b N_c O_d \rightarrow (m+a) CO + \frac{b}{2} H_2O + \frac{c}{2} N_2$$

To balance the above Equation 3 with respect to oxygen the following equation must apply:

(4) $$2m + d = m + a + \frac{b}{2}$$

Solving for $m$ by merely transposing terms:

(5) $$m = a + \frac{b}{2} - d$$

Then $(m+a)$ the quantity of carbon monoxide which is measured, becomes:

(6) $$m + a = 2a + \frac{b}{2} - d$$

By comparing Equation 6 with Equation 2, it will be seen that the value of $(m+a)$ is the same as the value of $n$ wherein $n$ is the oxygen demand expressed in the number of atoms. In other words, the quantity of carbon monoxide produced, in molecules (whether from the oxidation of carbon or the reduction of carbon dioxide), is the same as the number of oxygen atoms that would be required for complete oxidation.

Consequently, by injecting the aqueous sample to be analyzed into a heated stream of carbon dioxide as in the above examples and passing the gases through an analyzer sensitized to determine carbon monoxide, one is able to determine the total oxygen demand of the test sample. Of course, if the sample also contains an oxidant, such oxidant detracts from the amount of oxygen that must be obtained from carbon dioxide. Nevertheless the value measured represents the net total oxygen demand.

The use of a recirculating feed/carrier gas supply simplifies the equipment requirements over those wherein the feed/carrier gas is prepared and then discarded after it has passed through the apparatus a single time. Since all the carbon monoxide is converted to carbon dioxide before the feed/carrier gas enters the combustion conduit(s), the base line on the recorder should stay at a set level.

It is realized that a check valve may be desirable between the Hopcalite tube 87 and the combustion tube 22 in order to prevent back flow into the feed/carrier gas feed line.

What is claimed is:

1. A method of determining the oxygen demand of a material which comprises:
   flowing a recirculating feed gas stream containing carbon dioxide as essentially the sole oxidant into a combustion conduit having a heating zone at a temperature of at least 500° C. and through a suitable catalyst bed in the heating zone of said combustion conduit, said catalyst bed being effective to promote the equilibration of carbon dioxide with oxidizable components of the material to be analyzed,
   inserting a predetermined quantity of the material to be analyzed into the gas stream on the upstream side of the catalyst bed within the combustion conduit,
   sweeping gaseous product formed through the catalyst bed and unreacted feed gas from the heating zone into an analyzer for quantitatively indicating carbon dioxide,
   passing said gaseous product and unreacted feed gas from said analyzer into a reservoir and then introducing feed gas from said reservoir into said combustion conduit after converting gaseous product therein to carbon dioxide.

2. A method as in claim 1 wherein the heating zone of the combustion conduit is maintained at a temperature within the range from 500 to 1000° C.

3. A method as in claim 1 wherein the flowing feed gas stream is established at a constant and predetermined flow rate and the heating zone of the combustion conduit is maintained at a temperature within the range from 500 to 1000° C.

4. A method as in claim 3 wherein the analyzer continuously monitors the effluent gas to produce an electrical signal relative thereto and calibrating such signal to determine the total oxygen demand of the material analyzed.

5. A method as in claim 3 wherein the material analyzed is an aqueous dispersion having organic components.

6. A method as in claim 3 wherein the catalyst bed comprises a noble metal.

7. A method as in claim 6 including the additional step of cooling the effluent gas from the heating zone prior to introducing the same into the analyzer.

8. Apparatus for determining the total oxygen demand of a material, comprising:
   (a) a combustion conduit having an inlet, an outlet, a heating zone having a suitable catalyst bed of a material which promotes the equilibration of carbon dioxide with the oxidizable components of the material analyzed at an elevated temperature, said zone being disposed between said inlet and outlet,
(b) means for heating to and maintaining said heating zone at a predetermined reaction temperature,
(c) carbon monoxide detection means having a fluid inlet and a fluid outlet, said fluid inlet of said detection means being coupled to the outlet of said combustion conduit and the fluid outlet of the detection means being coupled to the inlet of said combustion conduit,
(d) means for circulating gas through said combustion conduit and said detection means,
(e) means for introducing material to be analyzed to said heating zone, and
(f) means coupled between said fluid outlet of said detection means and said inlet of said combustion conduit for converting carbon monoxide to carbon dioxide.

9. Apparatus in accordance with claim 8 wherein said means for circulating gas includes a reservoir of pressurized gas.

10. Apparatus in accordance with claim 8, wherein said carbon monoxide detection means is an infrared analyzer which produces an electrical signal relative to the carbon monoxide content of a gas stream passing therethrough.

11. Apparatus in accordance with claim 8 wherein a moisture removal device and a second combustion conduit similar to the first combustion conduit are connected in series in that order between the outlet of said first combustion conduit and the fluid input of said detection means, and means are provided for heating to and maintaining said heating zone of said second combustion conduit at a predetermined temperature.

12. Apparatus in accordance with claim 8 wherein said means for circulating gas includes a pump.

13. A method of determining the oxygen demand of a material which comprises:

flowing a recirculating feed gas stream containing carbon dioxide as essentially the sole oxidant into a first combustion conduit having a heating zone at a temperature of at least 500° C. and through a catalyst bed in the heating zone of said first combustion conduit, said catalyst bed being effective to promote the equilibration of carbon dioxide with oxidizable components of the material to be analyzed, inserting a predetermined quantity of the material to be analyzed into the gas stream on the upstream side of the catalyst bed within said first combustion conduit, sweeping gaseous product formed through the catalyst bed and unreacted feed gas from the heating zone of said first combustion conduit, drying said gaseous product and unreacted feed gas from said first combustion conduit, sweeping said gaseous product and unreacted feed gas from said first combustion conduit through a second combustion conduit of the type of said first combustion conduit at a temperature of at least 500° C., sweeping said gaseous product and unreacted feed gas from said second combustion conduit into an analyzer for quantitatively indicating carbon monoxide, and passing the gaseous product and unreacted feed gas from said analyzer into a reservoir and then introducing feed gas from said reservoir into said first combustion conduit after converting any carbon monoxide in said gaseous product to carbon dioxide.

References Cited

UNITED STATES PATENTS 3,421,856    1/1969    Stenger et al. _____ 23—230PC

MORRIS O. WOLK, Primary Examiner

E. A. KATZ, Assistant Examiner

U.S. Cl. X.R.

23—232, 253, 254